United States Patent
Bayer et al.

(10) Patent No.: US 6,392,904 B1
(45) Date of Patent: May 21, 2002

(54) DC/DC CONVERTER AND METHOD OF OPERATING A DC/DC CONVERTER

(75) Inventors: Erich Bayer, Thonhausen; Hans Schmeller, Falkenberg, both of (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/741,951

(22) Filed: Dec. 20, 2000

(30) Foreign Application Priority Data

Dec. 23, 1999 (DE) ......................................... 199 62 523

(51) Int. Cl.[7] ............................................. H02M 3/18
(52) U.S. Cl. ....................................................... 363/59
(58) Field of Search ..................... 363/59, 60; 327/536, 327/537; 307/110

(56) References Cited

U.S. PATENT DOCUMENTS

| | | | |
|---|---|---|---|
| 5,672,952 A | * | 9/1997 | Szepesi |
| 5,680,300 A | | 10/1997 | Szepesi et al. |
| 6,018,264 A | | 1/2000 | Jin |
| 6,172,493 B1 | * | 1/2001 | Grant .......................... 323/288 |
| 6,201,717 B1 | * | 3/2001 | Grant .......................... 363/60 |
| 6,229,385 B1 | * | 5/2001 | Bell et al. .................... 327/565 |
| 6,242,970 B1 | * | 6/2001 | Grant et al. ................. 327/536 |

FOREIGN PATENT DOCUMENTS

EP        0 716 368 A1    6/1996

\* cited by examiner

*Primary Examiner*—Adolf Deneke Berhane
(74) *Attorney, Agent, or Firm*—William B. Kempler; W. James Brady; Frederick J. Telecky, Jr.

(57) ABSTRACT

The invention relates to a DC/DC converter including a charge pump circuit comprising one or more capacitors and a plurality of controllable switches connected thereto, the controllable switches being controllable by a control circuit so that the capacitors is/are alternatingly switched in a charging and discharge phase; a first current source set to a predetermined base current located either in the discharge or charging path of the charge pump circuit and a second current source connected in parallel thereto; and a regulator circuit for generating a first control signal representing the difference between a voltage characterizing the output voltage and a first reference voltage and controlling the second current source when the charge pump circuit is active so that the controllable current is reduced or increased with an increase and reduction respectively in the difference to track the voltage characterizing the output voltage in accordance with the first reference voltage; and for generating a second control signal guided to the control circuit, this signal assuming a first status when the voltage characterizing the output voltage exceeds a second reference voltage at a predetermined level above the first reference voltage, upon which the control circuit deactivates the charge pump circuit, and assumes a second status when the voltage characterizing the output voltage drops below the second reference voltage, upon which the control circuit activates the charge pump circuit. The invention relates further to a method of operating a DC/DC converter.

20 Claims, 2 Drawing Sheets

DC/DC CONVERTER AND METHOD OF OPERATING A DC/DC CONVERTER

The invention relates to a DC/DC converter including a charge pump circuit and a method of operating one such DC/DC converter.

In addition to the supply voltage many electronic circuits require further voltages, the levels of which are sometimes higher than that of the supply voltage. One cost-effective, simple and—especially as compared to coil converters—highly compact solution to furnishing these further voltages are DC/DC converters operating on the charge pump principle. Such converters are described e.g. in the text book "The Art of Electronics" by Paul Horowitz, 2nd Edition, Cambridge University Press, New York 1991 on pages 377 to 379 thereof.

Horowitz also describes a simple DC/DC converter operating on the charge pump principle with which an output voltage corresponding maximally to roughly twice the input voltage is achievable. The basic circuit of the converter consists substantially of a charge pump capacitor and four controllable switches (e.g. MOSFETS) whereby one electrode of the charge pump capacitor is connectable via a first switch to the input voltage terminal of the converter and via a second switch to GND, and the other electrode of the capacitor is connectable via the third switch to the input voltage terminal and via the fourth switch to the output voltage terminal of the converter. The converter comprises furthermore a control circuit including a clock which clocks the switches so that in a first phase of a clock cycle, the so-called charging phase, the second switch and the third switch are ON whilst the other switches are OFF, so that the charge pump capacitor is charged to, the input voltage, and in the second phase of a clock cycle, the so-called discharge phase, the first switch and the fourth switch are ON whilst the other switches are OFF, so that then the charged charge pump capacitor is connected in series to the input voltage which outputs a voltage value to the smoothing and storage capacitor located at the output of the circuit, this voltage value corresponding to roughly twice the input voltage.

Correspondingly, charge pumps are conceivable which produce an optimum multiple of the input voltage, which invert or reduce the input voltage. However, in the DC/DC converter operating on the charge pump principle as described above the output voltage drops off undesirably so even for small load currents. Since in the majority of applications the output voltage which e.g. in digital electronic circuits amounts often to 3.3 or 5 V, is fixedly defined and is only allowed to fluctuate in a tight range, regulated converters have been developed which set the output voltage to a fixed desired voltage value.

These DC/DC converter regulators comprise as a rule a comparator which compares the actual output voltage or a voltage proportional to the actual output voltage (which may be derived from the output voltage e.g. across a voltage divider) to a defined reference voltage representing the design output voltage, and then when a deviation is sensed, outputs a control signal, with the aid of which the actual output voltage is adapted to the defined design output voltage value.

Described in U.S. Pat. No. 5,680,300 are two types of regulators used with DC/DC converters operating on the charge pump principle, the so-called linear regulator and the so-called skip-mode regulator.

In the linear regulator the control signal of the comparator changes, e.g. via a, gate of one of the MOSFET switches, the ON resistance of the MOSFET so that the drop in voltage across the switch is increased or decreased resulting in a reduction or increase in the actual output voltage of the converter. The linear regulator has, however, the disadvantage that the energy losses resulting from switching the switches of the charge pump are relatively high since the charge pump is always in operation in the case of the linear regulator. These energy losses result from the currents required to charge the gates of the MOS power transistors at a constant frequency even when no current flows at the output of the converter.

These disadvantage do not occur in the skip-mode regulator which makes use of the control signal of the comparator to cycle the charge pump ON/OFF depending on the output current requirement and the resulting actual output voltage of the DC/DC converter so that a charge is pumped to the smoothing and storage capacitor located at the output of the circuit only if the voltage across the capacitor has dropped below the design output voltage level. The skip-mode regulator thus operates particularly energy-saving and is particularly suitable for applications in which small load currents alternate with large load currents, i.e. it guaranteeing a minor quiescent current of the converter. The disadvantage of the skip-mode regulator is, however, that the ON/OFF switching times of the charge pump depend on the average output current in each case to be furnished by the DC/DC converter, i.e. the frequency spectrum resulting at the output of the converter is totally undefined. In addition to this the ripple of the output voltage is relatively heavy since the flow of output current is not continual in the skip-mode regulator.

A general object of a general present invention is thus to provide a DC/DC converter operating on the charge pump principle which is superior to the DC/DC converters regulated hitherto either by the skip mode or linear regulator principle and obviates the disadvantages as described above at least in part. In addition, the intention is to provide a corresponding method of operating a DC/DC converter which is superior to the method hitherto.

This and other objects and features are achieved in accordance with one aspect of the invention by a DC/DC converter including a charge pump circuit comprising:

one or more charge pump capacitors and a plurality of controllable switches connected thereto, the controllable switches being controllable by a control circuit so that the charge pump capacitors is/are alternatingly switched in a charging and discharge phase so that an output voltage deviating from the input voltage of the converter is generated at the output of the converter;

a first current source set to a predetermined base current located either in the discharge path of the charge pump circuit via which in the discharge phase current is supplied to the output of the converter, or in the charging path of the charge pump circuit, via which the charge pump capacitors is/are charged in the charging phase of the charge pump circuit; and a second current source connected in parallel to the first current source, the current of the second current source being controllable; and an output voltage regulator circuit for generating a first control signal representing the difference between a voltage characterizing the output voltage and a first reference voltage and controlling the second current source when the charge pump circuit is active so that the controllable current is reduced or increased with an increase and reduction respectively in the difference to track the voltage characterizing the output voltage in accordance with the first reference voltage; and for generating a second control signal guided to the control circuit, this signal assuming a first status when the voltage characterizing the output voltage exceeds a second reference voltage at a predetermined level above the- first reference voltage, upon which the control circuit deactivates the charge pump circuit, and assumes a second status when the voltage characterizing the output voltage drops below the second reference voltage, upon which the control circuit activates the charge pump circuit.

Another aspect of the invention includes a method for operating a DC/DC converter including a charge pump circuit comprising one or more charge pump capacitors and a plurality of controllable switches connected thereto comprising the steps cycling the charge pump capacitors by the controllable switches in a charging and discharge phase during operation of the charge pump circuit so that an output voltage deviating from the input voltage of the converter is generated at the output of the converter;

setting a controllable current flowing parallel to a predetermined base current with the charge pump circuit active in the discharge or charging path of the charge pump circuit as a function of the difference between a voltage characterizing the output voltage and a first reference voltage so that the controllable current is reduced or increased with an increase and reduction respectively in the difference to track the voltage characterizing the output voltage in accordance with the first reference voltage; and deactivating the charge pump circuit when the voltage characterizing the output voltage exceeds a second reference voltage at a predetermined level above the first reference voltage and activating the charge pump circuit when the voltage characterizing the output voltage drops below the second reference voltage at a predetermined level above the first reference voltage.

The DC/DC converter in accordance with, the invention makes clever use of the advantages afforded by the two differing regulated converters by it being skip-mode regulated when the converter output current is low and linearly regulated when the converter output current is higher, selecting the one or other regulating mode being done automatically and simply achievable. The DC/DC converter in accordance with the invention comprises both a high efficiency at low output currents and a defined output frequency spectrum at high output currents.

Advantageous further embodiments of the invention are characterized in the sub-claims.

The invention will now be detained by way of example embodiments as shown in the drawings in which.

Figure 1:
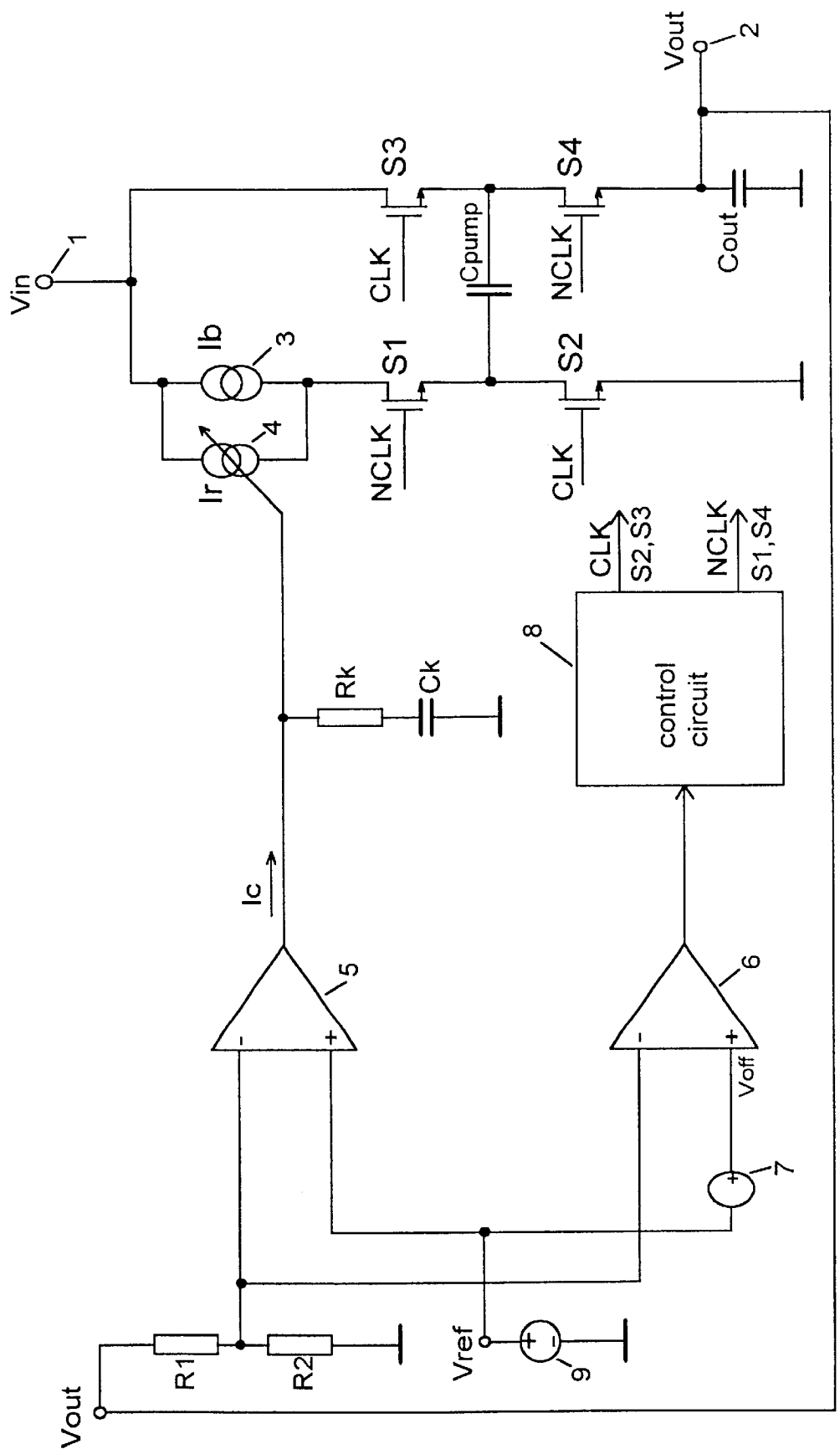
FIG. 1 is a circuit diagram of a first embodiment of the DC/DC converter in accordance with the invention.

Referring now to FIG. 1 there is illustrated a circuit diagram of a first embodiment of the DC/DC converter in accordance with the invention, the configuration of which will first be described.

The DC/DC converter in accordance with the invention as shown in FIG. 1 comprises substantially a charge pump circuit and a regulator circuit which regulates the output voltage of the DC/DC converter to a design value.

The charge pump circuit comprises a charge pump capacitor Cpump and four controllable switches S1, S2, S3, S4 preferably consisting of MOSFETs as shown in FIG. 1. The one electrode of the charge pump capacitor Cpump is connectable via a first controllable switch S1 to the input 1 of the DC/DC converter and via the second controllable switch S2 to GND, and the other electrode of the charge pump capacitor Cpump is connectable via the third controllable switch S3 to the input 1 of the DC/DC converter and via the fourth controllable switch to the output 2 of the DC/DC converter.

The charge pump circuit comprises in addition a first current source 3 located between the input 1 of the DC/DC converter and the first controllable switch S1 and furnishing a predetermined and constant basic current Ib, and a second current source 4 connected in parallel to the first current source 3 and furnishing an additional current Ir, the amperage of which is controllable. Located at the output 2 of the DC/DC converter, as is usual for DC/DC converters, is a storage capacitor Cout.

The output voltage regulator circuit comprises an operational amplifier 5 receiving at its non-inverting input a reference voltage Vref which e.g. may originate from a reference voltage generator circuit (not shown in detail). At its inverting input the operational amplifier receives a voltage proportional to the output voltage Vout of the DC/DC converter, this proportional voltage being tapped from the resistor R2 of the voltage divider comprising the two resistors R1 and R2 at which the output voltage Vout of the DC/DC converter is connected. The operational amplifier 5 is a so-called transconductance amplifier (VC-OPV) and furnishes at its output a current Ic as a function of the difference between the voltages applied to its inputs. It is this current that results in a voltage Vk being generated at the output RC compensation pad comprising the resistor Rk and the capacitor Ck, the voltage Vk being proportional to the difference between the voltage $(R2/(R1+R2))*Vout$ characterizing the output voltage, and the reference voltage. It is this voltage Vk that is used to control the current of the controllable current source 4 as explained below.

The output voltage regulator circuit comprises in addition a comparator 6 receiving at its inverting input the voltage $(R2/(R1+R2))*Vout$ proportional to the output voltage Vout and at its non-inverting input a second reference voltage Voff corresponding to the first reference voltage Vref plus a small offset voltage ΔVoff generated by the voltage source 7:

$$Voff = Vref + \Delta Voff$$

The comparator 6 outputs a control signal to the control circuit 8 which has one of two possible output statuses; a first output status when the voltage characterizing the output voltage is smaller than the reference voltage Voff, and a second output status when the voltage characterizing the output voltage is larger than the second reference voltage Voff.

The control circuit 8 which serves to control the controllable switches S1, S2, S3 and S4 of the charge pump circuit comprises conventionally as the central element a clock from which the signals "CLK" and "NCLK" are derived which are applied to the gates of the controllable switches S2, S3 or S1, S4. In this arrangement the "CLK" signal is opposite in phase to that of the "NCLK" signal.

The functioning of the DC/DC converter as shown in FIG. 1 will now be detained:

The charge pump circuit comprising the charge pump capacitor Cpump and four controllable switches S1, S2, S3, S4 cooperates with the control circuit 8 conventionally, i.e. the MOSFETs S2, S3 and MOSFETs S1, S4 are cycled ON by the clock signals "CLK" and "NCLK" so that the corresponding other MOSFETs in each case are OFF. Thus, when the MOSFETs S2, S3 are ON and the MOSFETs S1, S4 are OFF (charging phase) the charge pump capacitor Cpump is charged to the input voltage Vin, whereas when the MOSFETs S1, S4 are ON and the MOSFETs S2, S3 are OFF (discharge phase) the output capacitor Cout is charged by the input voltage source furnishing the voltage Vin and the charge pump capacitor Cpump. Maximally twice the input voltage Vin is attainable across the output capacitor Cout. Charging phase and discharge phase cycle as controlled by the control circuit 8.

The current flowing in the discharge phase representing the output current of the DC/DC converter is dictated by the sum of the currents from the first current source 3 and the controllable second current source 4. In this arrangement the average output current Iout is given by the following equation:

$$Iout=(Ir+Ib)/2 \qquad (2)$$

where Ib is the constant basic current furnished by the first current source 3 and Ir is the controllable current furnished by the second current source 4. The factor ½ results from the fact that the charge pump circuit furnishes a current only during the discharge phase (assuming that charging and discharge phase are equally long). As long as the output voltage Vout is smaller than the second reference voltage Voff regulation of the output voltage Vout is handled by the operational amplifier 5 in conjunction with the RC compensation pad Rk, Ck and the controllable second current source 4. When e.g. a change in the load occurs at the output of the DC/DC converter and thus the current flowing at the output of the DC/DC converter required as an average drops, then the output voltage Vout will increase until at some time the voltage $(R2/(R1+R2))*Vout$ characterizing the output voltage will exceed the value of the first reference voltage Vref. This increase is counteracted by the "linear regulation mechanism" involving the operational amplifier 5, the RC pad Rk, Ck and the controllable second current source 4 due to the difference between the reference voltage Vref and the voltage characterizing the output voltage at the inputs of the operational amplifier 5 generating a current IC corresponding to this difference at the output of the operational amplifier which produces across the RC pad a corresponding voltage Vk with which the voltage-controlled current source Ir is then controlled so that the current Ir is reduced. As a result of this the output capacitor Cout receives less current in the discharge phase of the charge pump cycle, resulting in the output voltage Vout finally reattaining the desired design voltage value $Vref*(R1+R2)/R2$. The linear regulation runs correspondingly inverse when the current required as an average at the output 2 of the DC/DC converter increases, the controllable second current source Ir then being controlled so that the current Ir is increased.

As soon as the current flowing at the output of the DC/DC converter attains on a time average the value Ib/2, the "linear regulation mechanism" as described above signals the second current source 4 OFF so completely that no current Ir flows any more at all, i.e. any further regulation of the output voltage Vout with a further drop in the average output current then no longer being possible by the operational amplifier 5 and the RC pad Rk, Ck.

When the average output current of the DC/DC converter drops below the value Ib/2 more charge is furnished to the output 2 of the DC/DC converter by the charge pump circuit per unit of time than is needed in this case, resulting in the output voltage Vout of the converter increasing. As soon as the output voltage Vout exceeds the value of the second reference voltage Voff, the comparator 6—now operating on the skip-mode principle—handles regulation of the output voltage Vout of the DC/DC converter, by a control signal having the first status (e.g. HI) being output to the control circuit 8 advising it that it is now required to deactivate the charge pump circuit 8 (the control signal output by the comparator 6 then assuming the above-mentioned second status (e.g. a LO) when the output voltage Vout is smaller than the second reference voltage Voff, differing from the first status). The control circuit 8 then deactivates the charge pump circuit (e.g. by deactivating the clock) as a result of which the output capacitor Cout no longer receives a charge for some time and the output voltage Vout across the output capacitor Cout decreases until at some point in time it drops below the value of the second reference voltage Voff. The comparator 6 then outputs the second control signal to the control circuit 8 as a result of which it activates the charge pump circuit 8 by it again commencing to cycle the MOSFETs S1, S4 and S2, S3 ON/OFF respectively in the manner as described above.

As compared to DC/DC converters operating hitherto in accordance with the charge pump principle the DC/DC converter in accordance with the invention has a number of advantages. When the output currents of the DC/DC converter are larger on an average, at which it operates in the linear regulation mode, it furnishes a defined frequency spectrum due to the known switching frequency of the control circuit clock. When the output currents of the DC/DC converter are smaller on an average, at which it operates in the skip- mode, it has a high efficiency since the charge pump circuit is only activated when energy is actually required at the output. As compared to existing solutions the ripple of the output voltage in the skip-mode is greatly reduced. In this arrangement the output voltage ripple in the skip-mode is limited by the output current peaks limited by the predetermined constant basic current Ib. The basic current Ib furnished during skip-mode regulation is precisely defined thus assuring that the selection between the two regulation modes is always made at the same output current. In addition to this the maximum output current of the charge pump circuit is limited by the arrangement of the two current sources to a value of (Ib+Irmax)/2.

Figure 2:
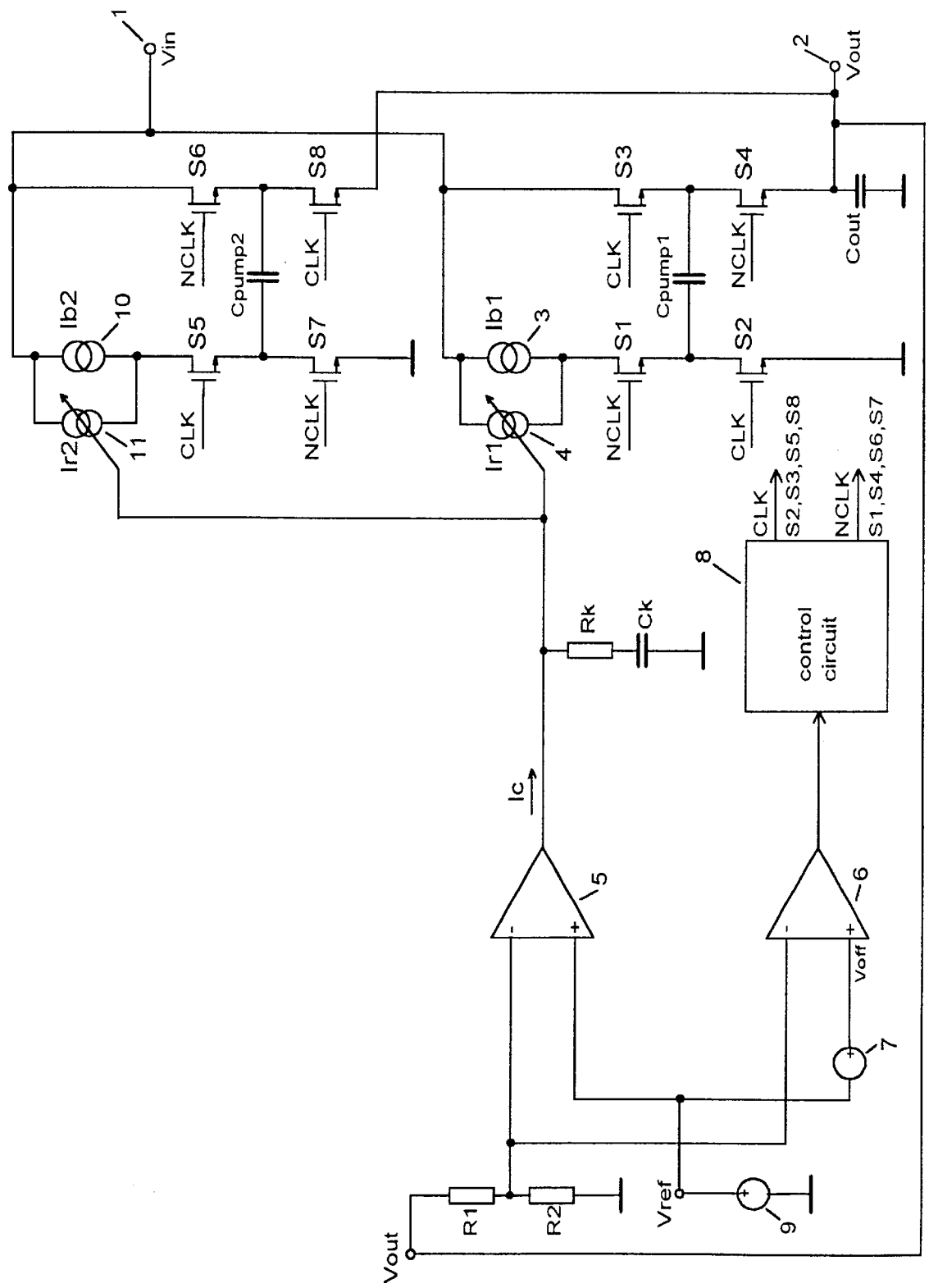
FIG. 2 is a circuit diagram of a second embodiment of the DC/DC converter in accordance with the invention.

Referring now to FIG. 2 there is illustrated a circuit diagram of a second embodiment of the DC/DC converter in accordance with the invention. The embodiment as evident from FIG. 2 differs from that as shown in FIG. 1 merely by, in this case, the second charge pump circuit (Cpump2, SS, S6, S7, SS, first current source 10 (Ib2), where Ib1=Ib2, controllable second current source 11 (Ir2) likewise controlled from the operational amplifier 5 in conjunction with the RC pad Rk, Ck) being provided which is configured and circuited the same as the first charge pump circuit (Cpump1, S1, S2, S3, S4, first current source 3 (Ib1), controllable second current source 4 (Ir1)). The second charge pump circuit comprising the charge pump capacitor Cpump2 and the four switches SS, S6, S7, SS is connected in parallel to the first charge pump circuit, it being controlled by the control circuit 8 opposite in phase to the first charge pump circuit, so that when the first charge pump circuit (Cpump1, S1-S4) is in the discharge phase (S1, S4 ON; S2, S3 OFF) then the second charge pump circuit (Cpump2, SS-SS) is in the charge phase (S6, S7 ON; SS, SS OFF) and vice-versa. This results in a continual flow of current to the output 2 of the DC/DC converter when the charge pump circuits are active, thus reducing the ripple in the output voltage Vout as compared to the embodiment as shown in FIG. 1. The opposite phase control is evident in FIG. 2 from the differing distribution of the two switching signals "CLK" and "NCLK" at the gates of the MOSFETs of the two charge pump circuits.

The various embodiments of the DC/DC converter in accordance with the invention are fabricated preferably in the form of an integrated circuit.

In addition, the circuit may be simplified also so that the MOSFETs are made use of as the first and second current source (3, 4 and 10, 11 resp.) as already provided in the discharge path, via which current flows in the discharge phase of the charge pump circuit to the output of the DC/DC converter, as controllable switches of the charge pump circuit. Thus, in the embodiment as shown in FIG. 2 the MOSFETs S1, S4, S5 or SB may be used as current sources which, when the circuit is fabricated integrated, results in a reduction in the chip surface area required.

The person skilled in the art will readily appreciate that that the circuits selected as example embodiments may be modified in many different ways without departing from the scope of protection afforded by the attached claims. Thus, for instance, the two current sources may be arranged e.g. in the charge pump circuit at a location other than that as shown in the embodiments, e.g. in the charging path of the charge pump circuit via which in the charging phase of the charge pump circuit the charge pump capacitor(s) is/are charged. Accordingly, even in a variation in the concrete configuration of the charge pump circuit in many different ways—whereby the circuit may, of course, comprise several charge pump capacitors and more or fewer controllable switches than is the case in the selected embodiments—this is still within the gist of the invention, the same as in making use of charge pump circuits which increase, invert or reduce the input voltage of the DC/DC converter.

What is claimed is:

1. A DC/DC converter including a charge pump circuit comprising:

one or more charge pump capacitors and a plurality of controllable switches connected thereto, said controllable switches being controllable by a control circuit so that said charge pump capacitor is alternatingly switched in a charging and discharge phase so hat an output voltage deviating from the input voltage of said converter is generated at the output of said converter;

a first current source set to a predetermined base current located either in the discharge path of said charge pump circuit via which in the discharge phase current is supplied to said output of said converter, or in the charging path of said charge pump circuit, via which said charge pump capacitor is charged in the charging phase of said charge pump circuit; and a second current source connected in parallel to said first current source, the current of said second current source being controllable; and an output voltage regulator circuit for generating a first control signal representing the difference between a voltage characterizing said output voltage and a first reference voltage and controlling said second current source when said charge pump circuit is active so that said controllable current is reduced or increased with an increase and reduction respectively in the difference to track the voltage characterizing said output voltage in accordance with said first reference voltage; and for generating a second control signal guided to said control circuit, this signal assuming a first status when said voltage characterizing said output voltage exceeds a second reference voltage at a predetermined level above said first reference voltage, upon which said control circuit deactivates said charge pump circuit, and assumes a second status when said voltage characterizing said output voltage drops below said second reference voltage, upon which said control circuit activates said charge pump circuit.

2. The DC/DC converter as set forth in claim 1, at the output of which a storage capacitor is provided.

3. The DC/DC converter as set forth in claim 1 wherein said second current source is a voltage-controlled current source.

4. The DC/DC converter as set forth in claim 3 wherein said output voltage regulator circuit comprises an operational amplifier receiving at its inputs said voltage characterizing said output voltage of said converter and said first reference voltage and generates at its output a current which varies with the difference between its two input voltages, its output being connected to a RC pad, by the voltage of which said second current source is controlled, and a comparator for comparing said voltage characterizing said output voltage of said converter to said second reference voltage and the output of which is connected to said control circuit receiving said second control signal and activating or deactivating said charge pump circuit as a function of the status of said second control signal.

5. The DC/DC converter as set forth in claim 1 comprising in addition a reference voltage generator circuit for generating said first reference voltage.

6. The DC/DC converter as set forth in claim 5 wherein said second reference voltage is generated from said first reference voltage.

7. The DC/DC converter as set forth in claim 1 wherein said control circuit comprises a clock, the clock signal of which cycles said controllable switches of said charge pump circuit ON/OFF.

8. The DC/DC converter as set forth in claim 1 wherein one or more of said controllable switches forms said first current source and/or said controllable second current source.

9. The DC/DC converter as set forth in claim 1 wherein all of said controllable switches are MOSFETS.

10. The DC/DC converter as set forth in claim 1 wherein said charge pump circuit comprises a charge pump capacitor and four controllable switches, one electrode of said charge pump capacitor being connectable via a first of said four switches to the input voltage of said converter and via a second of said four switches to GND, and the other electrode of said capacitor being connectable via the third of said four switches to said input voltage and via the fourth of said four switches to the output of said converter.

11. The DC/DC converter as set forth in claim 1 comprising a further charge pump circuit configured and circuited corresponding to said first charge pump circuit, the controllable switches of said further charge pump circuit being signaled by said control signal opposite in phase to those of said first charge pump circuit so that the ripple of said output voltage of said DC/DC converter is reduced.

12. The DC/DC converter as set forth in claim 2 wherein said second current source is a voltage-controlled current source.

13. The DC/DC converter as set forth in claim 4 comprising in addition a reference voltage generator circuit for generating said first reference voltage.

14. The DC/DC converter as set forth in claim 4 wherein said control circuit comprises a clock, the clock signal of which cycles said controllable switches of said charge pump circuit ON/OFF.

15. The DC/DC converter as set forth in claim 4 wherein one or more of said controllable switches forms said first current source and/or said controllable second current source.

16. The DC/DC converter as set forth in claim 4 wherein all of said controllable switches are MOSFETS.

17. The DC/DC converter as set forth in claim 4 wherein said charge pump circuit comprises a charge pump capacitor and four controllable switches, one electrode of said charge pump capacitor being connectable via a first of said four switches to the input voltage of said converter and via a second of said four switches to GND, and the other electrode of said capacitor being connectable via the third of said four switches to said input voltage and via the fourth of said four switches to the output of said converter.

18. The DC/DC converter as set forth in claim 4 comprising a further charge pump circuit configured and circuited corresponding to said first charge pump circuit, the controllable switches of said further charge pump circuit being signaled by said control signal opposite in phase to those of said first charge pump circuit so that the ripple of said output voltage of said DC/DC converter is reduced.

19. The DC/DC converter as set forth in claim 5 wherein said charge pump circuit comprises a charge pump capacitor and four controllable switches, one electrode of said charge pump capacitor being connectable via a first of said four switches to the input voltage of said converter and via a second of said four switches to GND, and the other electrode of said capacitor being connectable via the third of said four switches to said input voltage and via the fourth of said four switches to the output of said converter.

20. A method for operating a DC/DC converter including a charge pump circuit comprising one or more charge pump capacitors and a plurality of controllable switches connected thereto comprising the steps of:

cycling said charge pump capacitor by said controllable switches in a charging and discharge phase during operation of said charge pump circuit so that an output voltage deviating from the input voltage of said converter is generated at the output of said converter;

setting a controllable current flowing parallel to a predetermined base current with said charge pump circuit active in the discharge or charging path of said charge pump circuit as a function of the difference between a voltage characterizing said output voltage and a first reference voltage so that said controllable current is reduced or increased with an increase and reduction respectively in the difference to track said voltage characterizing said output voltage in accordance with said first reference voltage; and deactivating said charge pump circuit when said voltage characterizing said output voltage exceeds a second reference voltage at a predetermined level above said first reference voltage; and activating said charge pump circuit when said voltage characterizing said output voltage drops below said second reference voltage.

\* \* \* \* \*